United States Patent [19]
Dodt

[11] 4,179,923
[45] Dec. 25, 1979

[54] CRADLE MOUNTED DYNAMOMETER

[75] Inventor: Hans-Walter Dodt, Darmstadt, Fed. Rep. of Germany

[73] Assignee: Carl Schenck AG, Darmstadt, Fed. Rep. of Germany

[21] Appl. No.: 926,251

[22] Filed: Jul. 20, 1978

[30] Foreign Application Priority Data

Mar. 4, 1978 [DE] Fed. Rep. of Germany ....... 2809453

[51] Int. Cl.² .............................................. G01L 3/16
[52] U.S. Cl. ................................................... 73/134
[58] Field of Search ..................... 73/134, 135, 136 R; 308/2 A

[56] References Cited
U.S. PATENT DOCUMENTS

| 1,000,494 | 8/1911 | Clement | 73/136 X |
| 2,135,394 | 11/1938 | Geissen | 73/136 X |
| 2,389,361 | 11/1945 | Hagg et al. | 73/134 |
| 3,903,738 | 9/1975 | Malchow | 73/136 R |

FOREIGN PATENT DOCUMENTS 1089052  9/1960  Fed. Rep. of Germany ............. 73/134

Primary Examiner—Charles A. Ruehl
Attorney, Agent, or Firm—Connolly and Hutz

[57] ABSTRACT

A dynamometer is connected to a foundation by two pairs of leaf springs. One end of the leaf springs is firmly connected to the dynamometer and the other ends are connected to the foundation by pivot joints, which absorb rotation, oscillation and axial movement. The pivot joints are advantageously constituted by metal and rubber components.

5 Claims, 3 Drawing Figures ized inbetween two bushings 15 and 19. Such metal
CRADLE MOUNTED DYNAMOMETER

BACKGROUND OF THE INVENTION

This invention relates to a cradle mounted dynamometer, which is mounted by its ends on the foundation by means of at least two leaf springs. The leaf springs being firmly connected with the cradle mounted dynamometer and the planes, passing through the unstressed leaf springs, intersecting in the axis of said dynamometer.

Such a cradle mounted dynamometer is known from DE-AS No. 1,089,052. In this context, the leaf springs are connected in a form-locking manner with the foundation. Upon a rotation of the cradle mounted dynamometer, the leaf springs are put under a double bending stress and are deformed thereby into an "S" shape, which exerts considerable resilient force on the springs. The springs have a thin construction at the points which are subject to noticeable bending, whereby the buckling strength is diminished. Because of the double bending stress, a high-quality material with a high surface quality is required for the springs, which necessitates high manufacturing costs. Furthermore, such a device cannot absorb any axial stresses imposed by the cradle mounted dynamometer. Such linear extension sets in particularly in the operation of eddy-current brakes and amount up to about 1 mm. Furthermore, the axial oscillations of the test model connected with the cradle mounted dynamometer lead to a premature deflection of the mountings of the leaf springs and to great foundation stress.

Accordingly, the object of the invention is to provide the support of cradle mounted dynamometer with leaf springs which have a low restoring moment with a sufficient buckling strength.

SUMMARY

This object is solved accordingly to the invention in that the connection of the leaf springs with the foundation occurs by means of pivot joints, whose axes run parallel to the axis of the cradle mounted dynamometer. If the pivot joints enable an axial movement, the axial stresses of said dynamometer can be absorbed. An angle between leaf springs and foundation of about 60° has been shown to be particularly suitable when the required floor space is limited. If the pivot joints constitute a metal and rubber unit, the extensions of the dynamometer are absorbed uniformly, on the one hand, so that the center of the dynamometer and thus the place of input of the force are exerted by the dynamometer on the electric load cell remains stationary. On the other hand, the metal and rubber unit effects practically a complete absorption on the oscillations emitted by the test model and by the cradle mounted dynamometer, respectively.

BRIEF DESCRIPTION OF THE DRAWINGS

Novel features and advantages of the present invention will become apparent to one skilled in the art from a reading of the following detailed description in conjunction with the accompanying drawings wherein similar reference characters refer to similar parts and in which.

DESCRIPTION OF THE PREFERRED EMBODIMENTS

Figure 1:
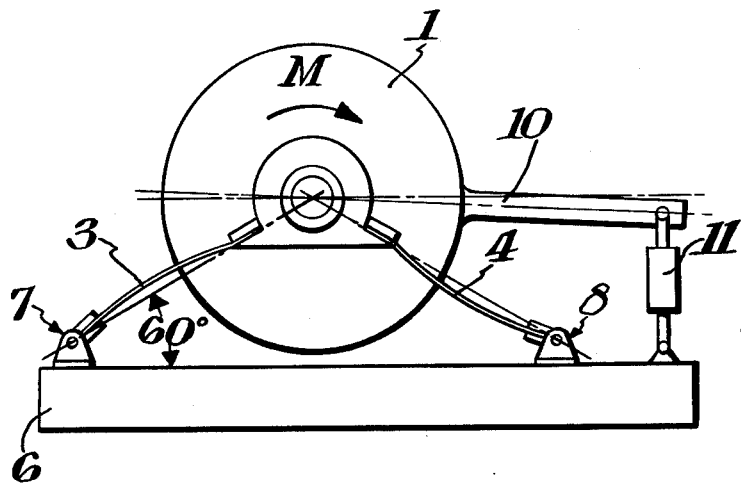
FIG. 1 is a side view in elevation of a dynamometer mounted on a foundation by one embodiment of this invention.
Figure 2:
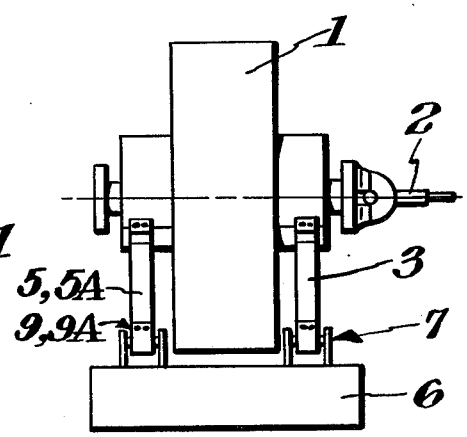
FIG. 2 is a left end elevational view of the embodiment shown in FIG. 1.

The cradle mounted dynamometer 1 is connected by means of shaft 2 with the test model, not illustrated in the drawing. Such dynamometer is supported on foundation 6 by means of leaf springs 3, 4, 5 and 5A. In so doing, the two leaf spring pairs are firmly connected with the dynamometer, e.g. by bolting. The connection with the foundation, however, occurs by means of pivot joints 7, 8, 9 and 9A, whose axes run parallel to the axis of the cradle mounted dynamometer. By means of this connection with the pivot joints, the leaf springs are put under stress only up to a simple bending force of a torsional moment M, absorbed by dynamometer 1, as shown in FIG. 1 in great exaggeration. Torsional moment M, picked up by the dynamometer 1, is transmitted by means of load leverage 10 into power measuring device 11, which is supported on foundation 6. A certain force introduced into the power measuring device 11 corresponds to a certain torsional moment M received from the cradle mounted dynamometer 1. This force effects a deformation of the power measuring device 11, dependent on the type of power measuring device 11, which in turn causes a rotation of the dynamometer correlated to moment M. A similar leaf spring, which is placed under double bending stress, would need to have approximately double the length, assuming the same rotation of the cradle mounted dynamometer, i.e. the same torsional moment M received, which signifies a buckling load, reduced approximately by the factor 2.

With the same spring length, the restoring moment of the springs, according to the prior art design, becomes greater by a multiple with the same necessary rotation of the cradle mounted dynamometer. Since leaf springs 3, 4, 5 and 5a are not a measuring instrument of the dynamometer, but rather it is the power-measuring device 11 that is the measuring instrument of the dynamometer, this increased restoring moment effects a respectively increased measuring inaccuracy. Linearity errors of the leaf springs and temperature error have a particularly disadvantageous effect on the measuring accuracy.

Since the cradle mounted dynamometer picks up stress, it becomes heated, which effects an elongation thereof. This linear extension sets in particularly in stators of eddy-current brakes. The linear alteration effects a stress on the mounting of the leaf springs and a stress on the leaf springs per se. If at least the pivot joints of one pair of leaf springs are constructed in such a manner that they may take up an axial displacement, the structural units are also not burdened by the linear extension.

Figure 3:
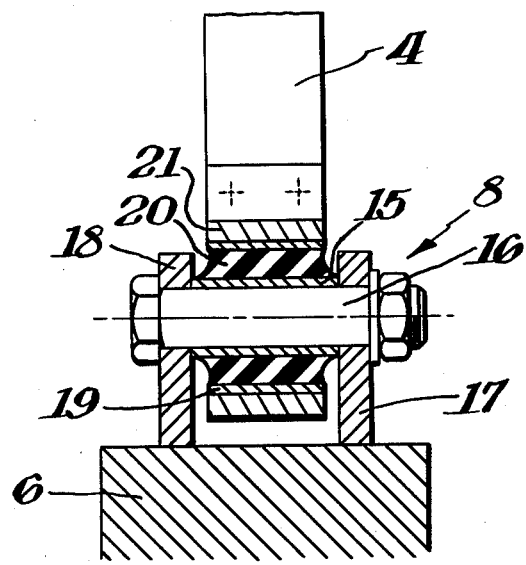
FIG. 3 is a cross-sectional view taken through one of the pivot joints shown in FIGS. 1 and 2.

A particularly suitable design of the novel cradle mounted dynamometer has been shown to be a dynamometer with a pivot joint 8, as illustrated in FIG. 3. The pivot joint 8 consists in this case essentially of a bushing and rubber spring, wherein the rubber is vulcanized inbetween two bushings 15 and 19. Such metal and rubber units are supplied by a company Carl Freudenberg in Weinheim, Federal Republic of Germany, under the designation "Ultrabuchsen." The inner bushing 15 is firmly connected with the foundation by means of a bolt 16 and supports 17, 18. The outer bushing 19 of the bushing and rubber spring 20 is firmly pressed into the eye-shaped end 21 of the leaf spring 4.

This bushing and rubber spring enable rotation, absorb the axial motion and, furthermore, almost completely absorb the oscillations produced by the test model and by the cradle mounted dynamometer, respectively. In addition, the bushing and rubber spring equalize the unavoidable manufacturing inaccuracies. If the same type of bushing and metal suspension, having the same resilience characteristics, are employed with respect to both pairs of leaf springs, then both pairs of leaf springs absorb one-half, as the case may be, of the linear extension of the cradle mounted dynamometer 1, so that the center of the dynamometer remains stationary, and consequently, even with the heating up of the dynamometer, the lower and upper suspensions of the power-measuring device 11 remain in a vertical line. The connection of the leaf spring pairs by means of bushing and rubber springs to the foundation has, therefore, been shown to be an optimum design of the invention.

The invention is not limited to the exemplary embodiment illustrated. For example, it is not necessary that the dynamometer be supported on the foundation by means of leaf springs; it may also be suspended on leaf springs. A further possibility is for the inner bushing of the bushing and metal spring to be connected with the foundation by means of a self-aligning ball bearing, so that the rotary motion may be taken up by the self-aligning ball bearing, while the axial motion and the oscillation damping may be effected by the metal and rubber unit. Of course, the cradle mounted dynamometer may not only be a dynamometrical brake, which takes up a torsional moments, but it may also be a motor, which exerts a torsional moment accordingly.

I claim:

1. A cradle mounted dynamometer which is mounted through its axis on a foundation by at least two leaf springs, the leaf springs being firmly connected with the dynamometer and having planes passing through their unstressed length which intersect the axis of the dynamometer, characterized in that pivot joints connect the ends of the leaf springs remote from the dynamometer with the foundation, and the pivot joints have axes which are disposed parallel to the axis of the dynamometer whereby rotation and oscillations are absorbed in the pivot joints.

2. A cradle mounted dynamometer as set forth in claim 1, wherein the pivot joints are constructed and arranged to permit an absorption of axial motion of the dynamometer.

3. A cradle mounted dynamometer as set forth in any one of claims 1 or 2, wherein the leaf springs have an angle between them and the foundation, and the angle is approximately 60°.

4. A cradle mounted dynamometer as set forth in any one of claims 1 or 2, wherein the pivot joints comprise metal and rubber components.

5. A cradle mounted dynamometer as set forth in claim 3, wherein the pivot joints comprise metal and rubber components.

* * * * *